(12) United States Patent
Dinkel

(10) Patent No.: US 11,945,419 B2
(45) Date of Patent: Apr. 2, 2024

(54) BRAKE SYSTEM AND MOTOR VEHICLE

(71) Applicant: Continental Teves AG & Co. OHG, Frankfurt am Main (DE)

(72) Inventor: Dieter Dinkel, Schwalbach (DE)

(73) Assignee: Continental Automotive Technologies GmbH, Hannover (DE)

(*) Notice: Subject to any disclaimer, the term of this patent is extended or adjusted under 35 U.S.C. 154(b) by 331 days.

(21) Appl. No.: 17/019,816

(22) Filed: Sep. 14, 2020

(65) Prior Publication Data
US 2021/0094523 A1    Apr. 1, 2021

(30) Foreign Application Priority Data

Sep. 26, 2019   (DE) .................. 10 2019 214 792.5

(51) Int. Cl.
| | |
|---|---|
| *B60T 8/40* | (2006.01) |
| *B60T 13/16* | (2006.01) |
| *B60T 13/58* | (2006.01) |
| *B60T 13/68* | (2006.01) |
| *B60T 15/02* | (2006.01) |

(52) U.S. Cl.
CPC ............ *B60T 13/58* (2013.01); *B60T 13/167* (2013.01); *B60T 13/686* (2013.01); *B60T 15/028* (2013.01); *B60T 2270/402* (2013.01); *B60T 2270/404* (2013.01); *B60T 2270/82* (2013.01)

(58) Field of Classification Search
CPC ...... B60T 8/885; B60T 8/4081; B60T 8/4013; B60T 8/368; B60T 8/3685; B60T 7/042; B60T 2270/413; B60T 13/745; B60T 13/686; B60T 13/58; B60T 13/167; B60T 15/028; B60T 2270/402; B60T 2270/404; B60T 2270/82

See application file for complete search history.

(56) References Cited

U.S. PATENT DOCUMENTS

| | | | |
|---|---|---|---|
| 2014/0020378 A1 | 1/2014 | Hotani et al. | |
| 2014/0028084 A1* | 1/2014 | Biller | B60T 13/686 303/9.62 |
| 2014/0152085 A1* | 6/2014 | Biller | B60T 8/4081 303/14 |
| 2014/0203626 A1* | 7/2014 | Biller | B60T 13/58 303/14 |
| 2017/0072920 A1* | 3/2017 | Besier | B60T 8/4081 |
| 2017/0129468 A1* | 5/2017 | Besier | B60T 8/4086 |
| 2019/0031165 A1* | 1/2019 | Besier | B60T 8/92 |
| 2019/0308596 A1* | 10/2019 | Besier | B60T 13/686 |
| 2020/0361439 A1* | 11/2020 | Neu | B60T 13/161 |

FOREIGN PATENT DOCUMENTS

| | | |
|---|---|---|
| DE | 102013214212 A1 | 2/2014 |
| DE | 102017219827 A1 | 5/2019 |

OTHER PUBLICATIONS

Search Report dated Mar. 16, 2020 from corresponding German Patent Application No. DE 102019214792.5.

\* cited by examiner

*Primary Examiner* — Nicholas J Lane
*Assistant Examiner* — Stephen M Bowes

(57) ABSTRACT

A brake system for a motor vehicle, wherein the brake system is divided into two blocks, wherein a separate electric pressure generator is arranged in each block, and a motor vehicle having such a brake system.

16 Claims, 4 Drawing Sheets

BRAKE SYSTEM AND MOTOR VEHICLE

CROSS REFERENCE TO RELATED APPLICATIONS

This application claims priority to German Patent Application No. DE 10 2019 214 792.5, filed Sep. 26, 2019, wherein the contents of such application is incorporated herein by reference.

TECHNICAL FIELD

The disclosure relates to a brake system for a motor vehicle and to a motor vehicle having a brake system of this kind.

TECHNICAL BACKGROUND

Brake systems are typically used in motor vehicles in order to selectively decelerate said vehicles. In this context, novel brake systems are typically based on the fact that a pressure generated by a driver in a brake master cylinder is intensified by means of a linear actuator or that the brake pressure is generated exclusively by a linear actuator based on an electronically sensed driver braking demand.

Linear actuators are typically integrated into a block of the brake system, wherein other components, e.g. valves or lines, may also be integrated into this block. The maximum volume of the linear actuator thus depends on existing production related restrictions in the production of corresponding blocks. This limits the size of motor vehicles that can be operated by means of a certain manufacture.

What is needed is a brake system which is embodied in an alternative or better way in this respect.

BRIEF DESCRIPTION OF THE DRAWINGS

Further features and advantages will be taken by a person skilled in the art from the exemplary embodiment described below with reference to the appended drawing, in which.

DETAILED DESCRIPTION

Figure 1:
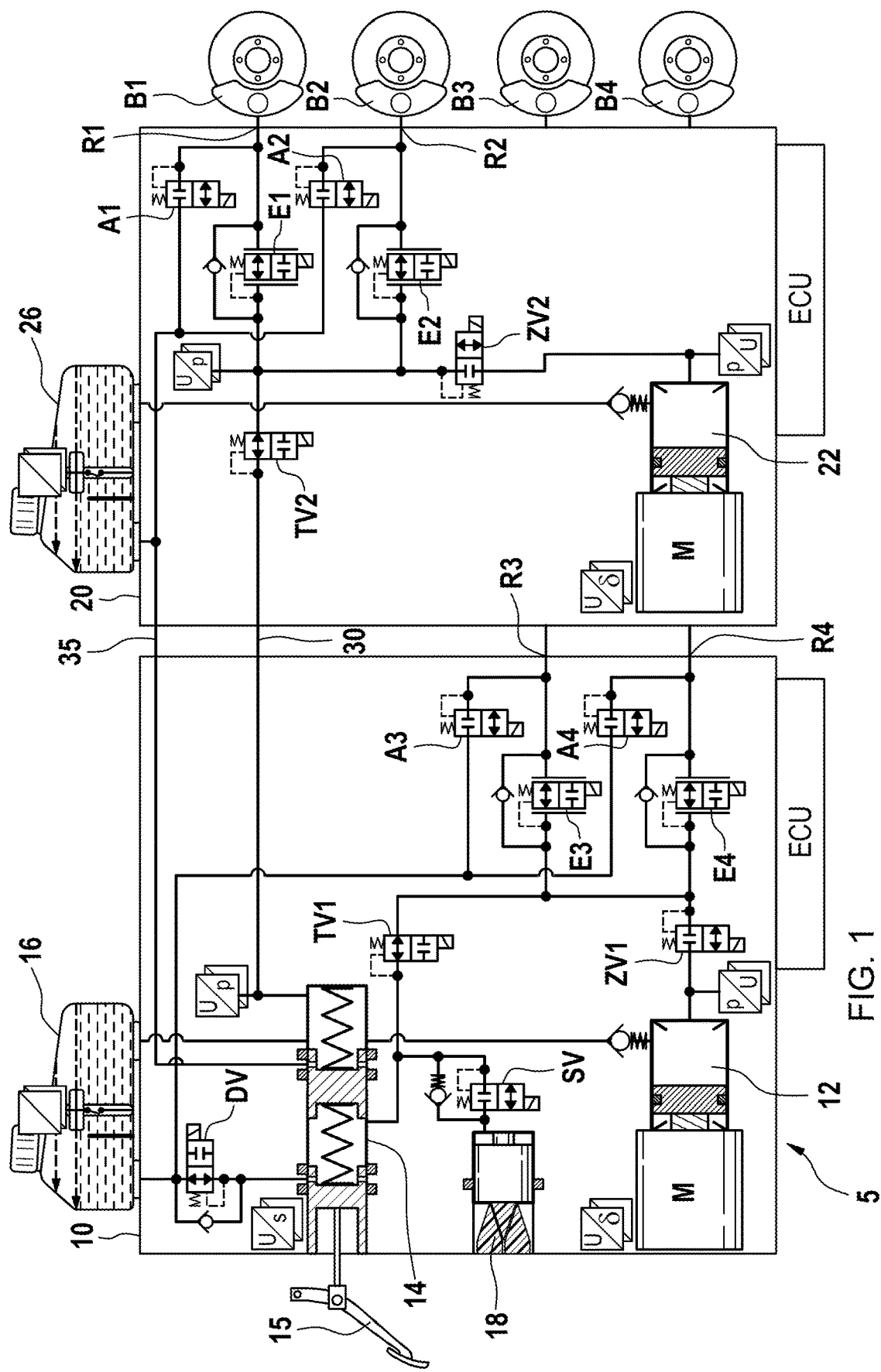
FIG. 1: shows a brake system according to a first exemplary embodiment.

The disclosure relates to a brake system for a motor vehicle. The brake system has a first block and a second block, wherein the second block is separate from the first block. The brake system has a brake master cylinder, which is arranged in the first block. The brake system has a first electric pressure generator, which is arranged in the first block. The brake system furthermore has a second electric pressure generator, which is arranged in the second block.

The brake system has a plurality of inlet valves.

The brake system has a first group of wheel ports, which are arranged on the first block and are connected to the brake master cylinder and the first electric pressure generator via a respective inlet valve. The brake system furthermore has a second group of wheel ports, which are arranged on the second block and are connected to the second electric pressure generator via a respective inlet valve.

By means of the brake system according to the invention, it is possible to ensure that the functionality can be divided into two blocks, wherein each block has a dedicated electric pressure generator, e.g. a linear actuator. Given the existing restrictions in the manufacture of the blocks, it is thereby nevertheless possible to construct a brake system which is suitable for relatively large and heavy vehicles.

Inlet valves are typically arranged directly at the respective wheel ports. It is thereby possible to direct pressure or volume selectively to the respective wheel port and, for example, to pass it on to a wheel brake connected thereto.

The first group of wheel ports can be assigned to a front axle, for example, and the second group of wheel ports can be assigned to a rear axle, for example, or vice versa. Diagonal division of the wheel ports is also possible, however, According to one embodiment, the wheel ports of the second group are connected to the brake master cylinder via the respective inlet valves and a connecting line connecting the blocks. By means of a connecting line of this kind, it is possible to establish a fluidic connection to the wheel ports of the second group from the first block.

According to one embodiment, an additional brake cylinder is arranged in the second block, wherein the additional brake cylinder has a piston, which divides the additional brake cylinder into a first pressure chamber and a second pressure chamber. The first pressure chamber is connected to the brake master cylinder via a connecting line connecting the blocks. The wheel ports of the second group are connected to the second pressure chamber via the respective inlet valves. By means of an embodiment of this kind, it is also possible to divide the functionality of the brake master cylinder between the two blocks, which allows a further hydraulic split, for example, and likewise allows a better division of manufacturing capacities.

In this case, for example, pressure is generated in the first pressure chamber from the first block and is passed on to the second pressure chamber by the piston. The pressure which arises in the second pressure chamber then passes to the wheel ports of the second group.

The first electric pressure generator can be connected, in particular via a common sequence valve, to inlet valves connected to the first electric pressure generator. It is likewise possible for the second electric pressure generator to be connected via a common sequence valve to inlet valves connected to the second electric pressure generator. In the respective embodiment, this can mean that the respective pressure generator is connected to the respective inlet valves only by a sequence valve assigned to the pressure generator.

According to one embodiment, the first electric pressure generator is connected via a respective separate sequence valve to each of the inlet valves connected to the first electric pressure generator. It is likewise possible, according to one embodiment, for the second electric pressure generator to be connected via a respective separate sequence valve to each of the inlet valves connected to the second electric pressure generator. This also makes it possible for each inlet valve to be assigned a respective separate sequence valve as a connection to the respective pressure generator, allowing even greater subdivision and control.

The inlet valves connected to the wheel ports of the first group can be connected to one another on the inlet side. It is likewise possible for the inlet valves connected to the wheel ports of the second group to be connected to one another on the inlet side. This allows pressure equalization between the respective inlet valves.

The inlet valves connected to the wheel ports of the first group can be connected to the brake master cylinder, in particular via a common isolating valve. It is likewise possible for the inlet valves connected to the wheel ports of the second group to be connected to the brake master cylinder or to the additional brake cylinder via a common isolating valve. This allows the use of a respective common isolating valve, which saves expenditure.

The first electric pressure generator and the second electric pressure generator have power supplies which are independent of one another. It is thereby possible to achieve redundancy, wherein, if one power supply fails, it is still possible to use the other pressure generator, for example.

The brake system has at least one brake fluid reservoir and a number of outlet valves. In this case, each wheel port is connected to a brake fluid reservoir via a respective outlet valve. This enables advantageous discharge of pressure or fluid into the brake fluid reservoir.

According to one embodiment, the brake system has a first brake fluid reservoir and a second brake fluid reservoir, wherein the brake system has a number of outlet valves, wherein each wheel port of the first group is connected to the first brake fluid reservoir via a respective outlet valve, and wherein each wheel port of the second group is connected to the second brake fluid reservoir via a respective inlet valve. It is thereby possible to achieve particularly advantageous splitting of two hydraulic circuits, wherein each circuit has its own brake fluid reservoir. It is thus advantageously possible to dispense with an additional connecting line for returning hydraulic fluid.

According to one embodiment, the brake master cylinder is in this case connected on the suction side both to the first brake fluid reservoir and to the second brake fluid reservoir. Connection between the circuits can thereby be achieved.

According to another embodiment, the brake master cylinder is connected on the suction side to the first brake fluid reservoir and not to the second brake fluid reservoir, and/or the additional brake cylinder is connected on the suction side to the second brake fluid reservoir and not to the first brake fluid reservoir. By means of separate allocation of the brake cylinders to the respective brake fluid reservoirs, splitting of circuits can be achieved, thereby making it possible to dispense with a return line, for example. For example, the first brake fluid reservoir can be arranged on the first block or assigned to the first block, and the second brake fluid reservoir can be arranged on the second block or assigned to the second block.

The first electric pressure generator can be connected, in particular on the suction side, to the first brake fluid reservoir and not to the second brake fluid reservoir. The second electric pressure generator can be connected, in particular on the suction side, to the second brake fluid reservoir and not to the first brake fluid reservoir. By this means too, splitting of the circuits can be achieved, thereby making it possible to dispense with a return line, for example.

It is possible for the brake master cylinder to be a tandem brake master cylinder. However, it is also possible to use a simple brake master cylinder. The first electric pressure generator can be a linear actuator, and the second electric pressure generator can likewise be a linear actuator. Linear actuators of this kind have been found to be advantageous for typical applications. As an alternative, however, a different embodiment of an electric pressure generator, e.g. a piston pump or a gear pump, can likewise be used.

The disclosure furthermore relates to a motor vehicle having a brake system according to the invention, wherein, in respect of the brake system, reference may be made to all the embodiments and versions described herein. The motor vehicle has a brake pedal, which is coupled to the brake master cylinder. The motor vehicle has a number of wheel brakes, which are connected to the wheel ports of the brake system.

As already mentioned above, the use of a brake system in a motor vehicle of this kind ensures that a significantly higher braking performance can be achieved, even with the existing restrictions in the manufacture of blocks for a brake system, and therefore the motor vehicle can have significantly larger dimensions and/or masses.

The motor vehicle can have a first wheel brake, a second wheel brake, a third wheel brake, and a fourth wheel brake. In this case, the first wheel brake is assigned to a front wheel, and the second wheel brake is assigned to a diagonally opposite rear wheel. The third wheel brake is assigned to a front wheel, and the fourth wheel brake is assigned to a diagonally opposite rear wheel.

In this case, the first wheel brake and the second wheel brake are connected to the wheel ports of the second group. The third wheel brake and the fourth wheel brake are connected to the wheel ports of the first group.

By means of such an embodiment, diagonal division of the wheel ports is achieved, and this has proven particularly advantageous for the type of brake system disclosed herein.

FIG. 1 shows a brake system 5 according to a first exemplary embodiment of the invention. The brake system has a first block 10 and a second block 20. A first linear actuator 12 is arranged in the first block 10 as a first electric pressure generator. A brake master cylinder 14, to which a brake pedal 15 is connected, is also arranged in the first block 10. This enables a driver to generate a pressure in the brake master cylinder 14 and to indicate a braking demand by means of actuation of the brake pedal 15.

Arranged in the first block 10 is a simulator 18, which is connected to the brake master cylinder 14 via a simulator valve SV. In the present case, the brake master cylinder 14 is a tandem brake master cylinder. A first isolating valve TV1 is connected to the brake master cylinder 14, wherein, when the isolating valve TV1 is closed and the simulator valve SV is open, the brake master cylinder 14 acts on the simulator 18, as a result of which the pressure generated is discharged. The braking demand can be detected by means of a displacement sensor "U/s".

A first brake fluid reservoir 16 is arranged on the first block 10. This reservoir is connected to the brake master cylinder 14 via a diagnostic valve DV. This allows additional brake fluid to be drawn in by the brake master cylinder 14. The first linear actuator 12 is also connected to the first brake fluid reservoir 16 for the purpose of drawing in additional fluid.

A second linear actuator 22 is arranged in the second block 20 as a second electric pressure generator. A second brake fluid reservoir 26 is arranged on the first block 20. As shown, the second linear actuator 22 is connected to the second brake fluid reservoir 26 for the purpose of drawing in additional fluid.

For control of the components of the first block 10, a first control device ECU1 is provided. For control of the components of the second block 20, a second control device ECU2 is provided.

A first wheel port R1 and a second wheel port R2 are arranged on the second block 20. Respective brakes B1, B2, which are external to the brake system 5, are connected to said ports. The brakes B1, B2 and also brakes that will be described below can, for example, be part of a motor vehicle in which the brake system 5 is installed.

The wheel ports R1, R2 are connected via a respective inlet valve E1, E2 to a node, which is connected to the brake master cylinder 14 via a second isolating valve TV2. This node is likewise connected to the second linear actuator 22 via a second sequence valve ZV2. By means of the respective inlet valves E1, E2, the first wheel port R1 and the second wheel port R2 can thus both be supplied with pressure from the brake master cylinder 14 via the second isolating valve TV2 and supplied with pressure from the second linear actuator 22.

In corresponding fashion, a third wheel port R3 and a fourth wheel port R4 are arranged on the first block 10, and respective wheel brakes B3, B4 are connected to said ports. The third wheel port R3 and the fourth wheel port R4 are connected via a respective inlet valve E3, E4 to the first isolating valve TV1 already mentioned, thus allowing pressure to be supplied from the brake master cylinder 14. The third inlet valve E3 and the fourth inlet valve E4 are likewise connected to the first linear actuator 12 via a first sequence valve ZV1, and therefore pressure can also be supplied at the third wheel port R3 and the fourth wheel port R4 by means of the first linear actuator 12.

As shown, the wheel ports R1, R2, R3, R4 are connected to the two brake fluid reservoirs 16, 26 via respective outlet valves A1, A2, A3, A4. This allows discharge of pressure or brake fluid volume that is no longer required at a respective wheel port R1, R2, R3, R4 into the brake fluid reservoirs 16, 26.

As shown, the second isolating valve TV2 is connected to the brake master cylinder 14 via a connecting line 30. To allow equalization on the return side as well, there is a return line 35 between the first block 10 and the second block 20. The hydraulic circuits are thus not completely separated.

Splitting into a first linear actuator 12 and a second linear actuator 22 ensures that a sufficiently large volume is provided to carry out braking operations. Ideally, this is accomplished with a diagonal split of the brake system in order to use and burden the linear actuators 12, 22 as uniformly as possible.

The inlet valves E1, E2, E3, E4, the isolating valves TV1, TV2 and the diagnostic valve DV are embodied in such a way as to be open when deenergized, thus allowing a hydraulic fallback level. The other valves mentioned are embodied in such a way as to be closed when deenergized, thus ensuring that they do not interfere in a hydraulic fallback level.

In the present case, the third and fourth wheel ports R3, R4 form a first group of wheel ports. In the present case, the first and second wheel ports R1, R2 form a second group of wheel ports. This division of the groups relates only to the nomenclature and allows conventional numbering of the valves, wheel ports and brakes from the highest to the lowest.

Figure 2:
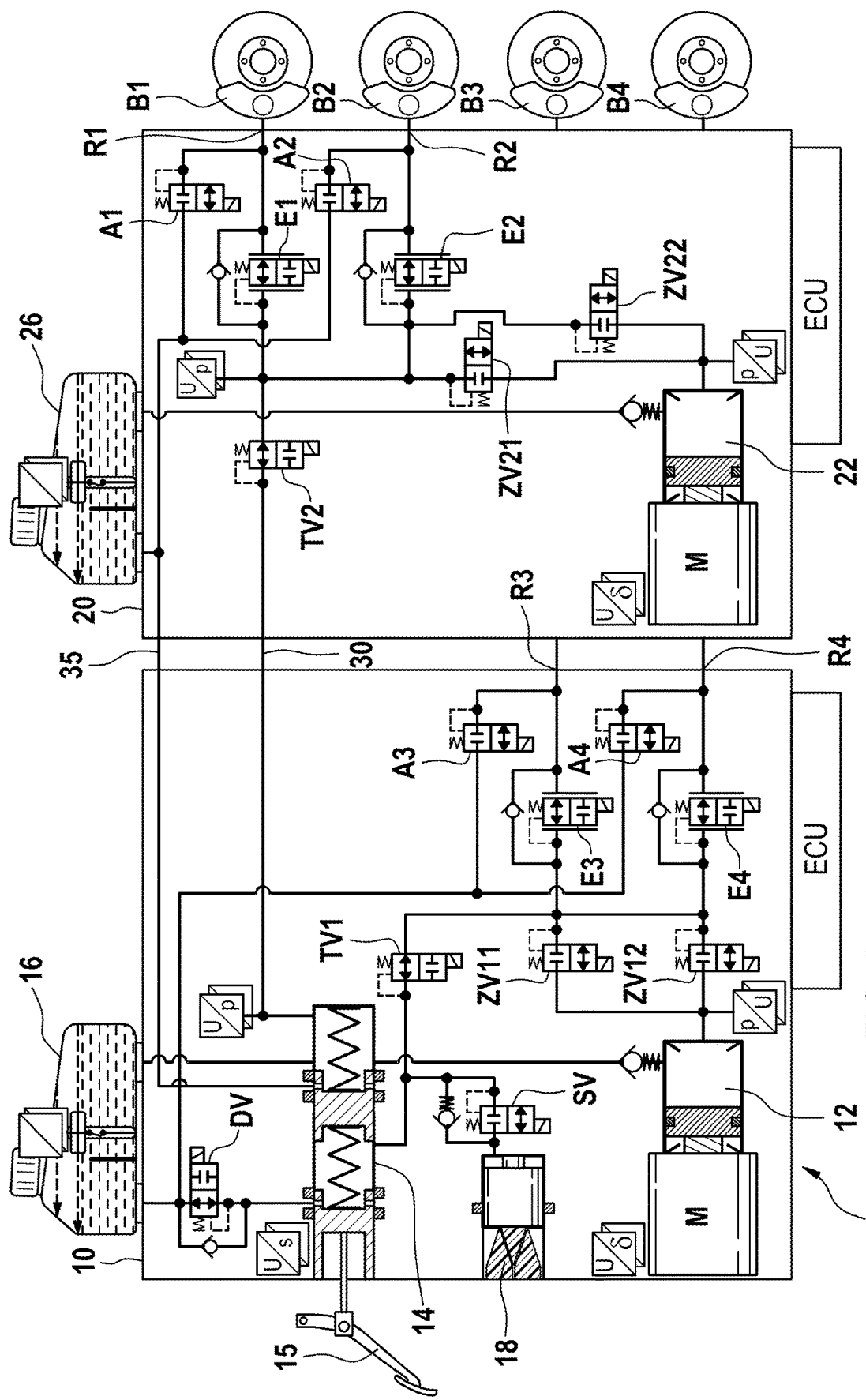
FIG. 2: shows a brake system according to a second exemplary embodiment.
Figure 3:
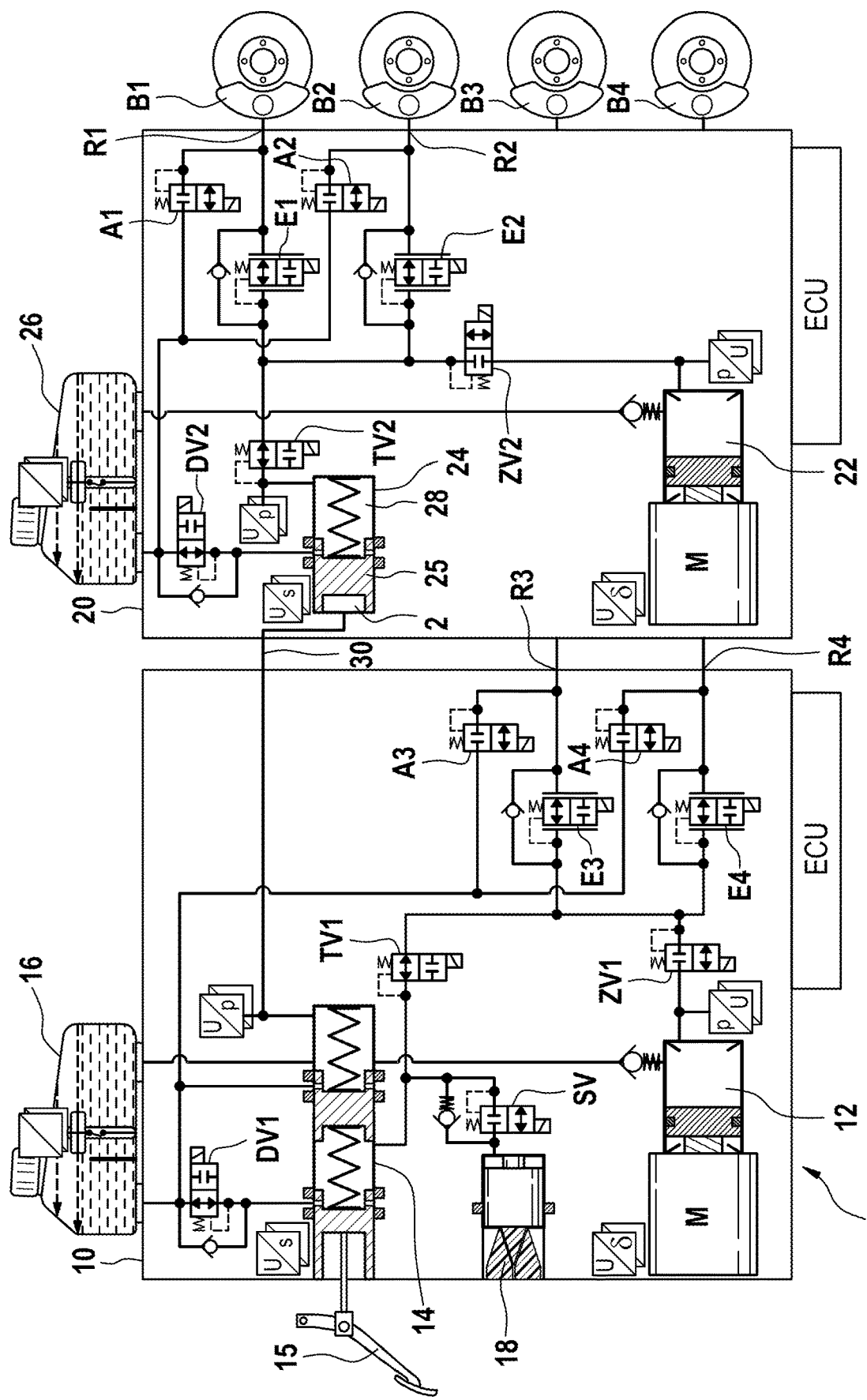
FIG. 3: shows a brake system according to a third exemplary embodiment.
Figure 4:
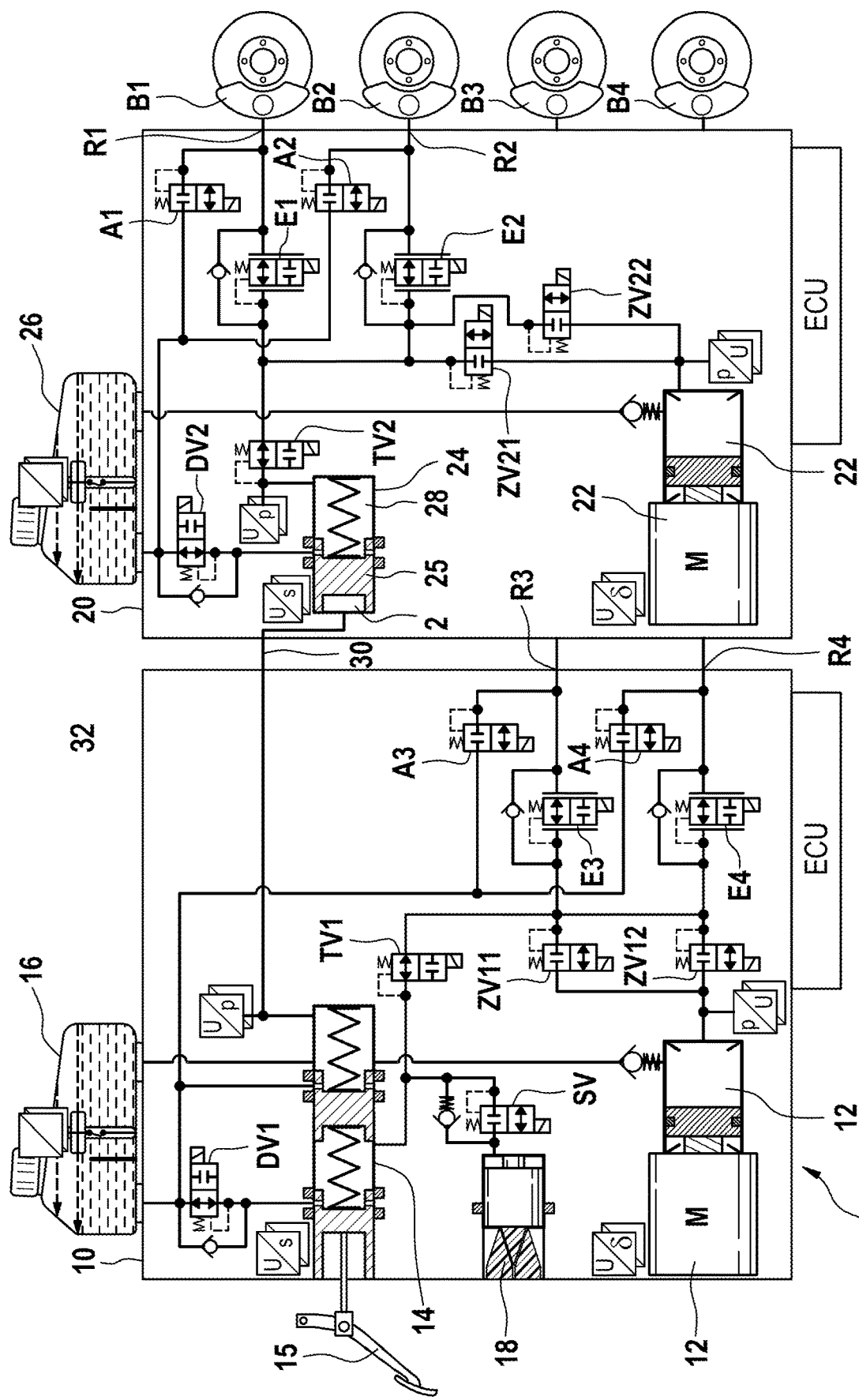
FIG. 4: shows a brake system according to a fourth exemplary embodiment.

FIGS. 2 to 4 show further exemplary embodiments of a brake system 5 according to the invention, wherein it will be the differences relative to the embodiment shown in FIG. 1 that will be explained below.

FIG. 2 shows a brake system 5 according to a second exemplary embodiment. In this system, not only is each linear actuator 12, 22 connected to a respective sequence valve ZV, but the first linear actuator 12 is connected to the third inlet valve E3 and the fourth inlet valve E4 via a first sequence valve ZV11 and a further first sequence valve ZV12. The second linear actuator 22 is likewise connected to the first inlet valve E1 and the second inlet valve E2 via a second sequence valve ZV21 and a further second sequence valve ZV22. It is thereby possible to pass higher volume flows from the respective linear actuator 12, 22 to the inlet valves E.

FIG. 3 shows a brake system 5 according to a third exemplary embodiment. In this system, the hydraulic circuits are completely split between the first block 10 and the second block 20, wherein an additional brake cylinder 24 is arranged in the second block 20. This cylinder is divided into a first pressure chamber 27 and a second pressure chamber 28. A piston 25 is situated between these two pressure chambers 27, 28. As shown, the first pressure chamber 27 is connected to the brake master cylinder 14 via the connecting line 30. As a result, pressure can be transferred from the brake master cylinder 14 into the first chamber 27, thereby moving the piston 25 and thus also building up the pressure in the second chamber 28. The second chamber 28 is connected to the inlet valves E and wheel ports R arranged in the second block 20 via the already mentioned second isolating valve TV2 in a manner corresponding to the embodiment in FIG. 1. For the induction of additional fluid, the additional brake cylinder 24 is connected to the second brake fluid reservoir 26 via a second diagnostic valve DV2.

The embodiment shown in FIG. 3 makes it possible to dispense with the return line 35. This eliminates a connection between the two blocks 10, 20.

A suitable hydraulic transmission ratio, depending on the basic design of the brake system 5, particularly in the case of a black and white split, between the brake master cylinder 14 and the additional brake cylinder 24 may also confer advantages in the design of the fallback level, e.g. an increased residual volume or a higher pressure level. Since the two circuits are completely separated hydraulically, it is possible to dispense with the return line 35.

FIG. 4 shows a brake system 5 according to a fourth exemplary embodiment. In this system, as in FIG. 3, a split is provided between the hydraulic circuits, wherein, as a departure from FIG. 3, each of the two linear actuators 12, 22 is connected to the respective inlet valves E via two sequence valves ZV in each case, which corresponds once again to the concept in FIG. 2. The two modifications with respect to FIG. 1 which are illustrated separately from one another in FIGS. 2 and 3 are thus both implemented in FIG. 4.

If a separate power supply 32 is provided for the two linear actuators 12, 22 or blocks 10, 20 and/or for the control devices ECU1, ECU2, redundancy can be achieved. On a fallback level, it is possible, for example, to brake by means of a normal brake by wire function using a single circuit, wherein it is additionally possible, in a failed circuit or a failed block 10, 20, to brake using only the force of a foot and thus to brake beyond the required minimum braking effect.

It is pointed out that features may be described in combination in the claims and in the description, for example to facilitate understanding, although these may also be used separately from each other. The person skilled in the art will gather that such features may also be combined with other features or feature combinations independently of each other.

Dependency references in the dependent claims may characterize combinations of the respective features but do not exclude other feature combinations.

The invention claimed is:

1. A brake system for a motor vehicle comprising:
   a first block;
   a second block separate from the first block;
   a brake master cylinder arranged in the first block;

a first electric pressure generator arranged in the first block;

a second electric pressure generator arranged in the second block;

a plurality of inlet valves;

a first group of wheel ports arranged on the first block and are each connected to the brake master cylinder and the first electric pressure generator via respective inlet valves of the plurality of inlet valves; and a second group of wheel ports arranged on the second block and are each connected to the second electric pressure generator via additional respective inlet valves of the plurality of inlet valves; and wherein the inlet valves connected to the wheel ports of the first group are connected to the brake master cylinder via a common isolating valve, and the inlet valves connected to the wheel ports of the second group are connected to one of the brake master cylinder or to an additional brake cylinder via an additional common isolating valve.

2. The brake system as claimed in claim 1, wherein the wheel ports of the second group are connected to the brake master cylinder via the second respective inlet valves of the plurality of inlet valves and a connecting line connecting the blocks.

3. The brake system as claimed in claim 1, wherein an additional brake cylinder is arranged in the second block, the additional brake cylinder has a piston which divides the additional brake cylinder into a first pressure chamber and a second pressure chamber, wherein the first pressure chamber is connected to the brake master cylinder via a connecting line connecting the blocks, wherein the wheel ports of the second group are connected to the second pressure chamber via the respective inlet valves.

4. The brake system as claimed in claim 1, wherein the first electric pressure generator is connected via a common sequence valve to at least one inlet valve of the plurality of inlet valves connected to the first electric pressure generator.

5. The brake system as claimed in claim 4, wherein the second electric pressure generator is connected via a common sequence valve to at least one inlet valve of the plurality of inlet valves connected to the second electric pressure generator.

6. The brake system as claimed in claim 1, wherein the second electric pressure generator is connected via a common sequence valve to at least one inlet valve of the plurality of inlet valves connected to the second electric pressure generator.

7. The brake system as claimed in claim 1, wherein the first electric pressure generator is connected via a respective separate sequence valve to each of the inlet valves connected to the first electric pressure generator, and/or wherein the second electric pressure generator is connected via a respective separate sequence valve to each of the inlet valves connected to the second electric pressure generator.

8. The brake system as claimed in claim 7, wherein the inlet valves connected to the wheel ports of the first group are connected to one another on the inlet side, and/or wherein the inlet valves connected to the wheel ports of the second group are connected to one another on the inlet side.

9. The brake system as recited in claim 1, wherein the first electric pressure generator and the second electric pressure generator have power supplies which are independent of one another.

10. The brake system as claimed in claim 1, wherein the brake system has at least one brake fluid reservoir and a plurality of outlet valves, wherein each wheel port is connected to the at least one brake fluid reservoir via a respective outlet valve of the plurality of outlet valves.

11. The brake system as claimed in claim 1, wherein the brake system has a first brake fluid reservoir and a second brake fluid reservoir, wherein the brake system has a plurality of outlet valves, wherein each wheel port of the first group is connected to the first brake fluid reservoir via respective outlet valves of the plurality of outlet valves, wherein each wheel port of the second group is connected to the second brake fluid reservoir via respective outlet valves of the plurality of outlet valves.

12. The brake system as claimed in claim 11, wherein the brake master cylinder is connected on the suction side both to the first brake fluid reservoir and to the second brake fluid reservoir.

13. The brake system as claimed in claim 11, wherein the brake master cylinder is connected on the suction side to the first brake fluid reservoir and not to the second brake fluid reservoir, and/or wherein an additional brake cylinder is connected on the suction side to the second brake fluid reservoir and not to the first brake fluid reservoir.

14. The brake system as claimed in claim 13, wherein the first electric pressure generator is connected on the suction side to the first brake fluid reservoir and not to the second brake fluid reservoir, and/or wherein the second electric pressure generator is connected on the suction side to the second brake fluid reservoir and not to the first brake fluid reservoir.

15. A motor vehicle comprising:

a brake system comprising:

a first block, a second block separate from the first block, a brake master cylinder arranged in the first block, a first electric pressure generator arranged in the first block, a second electric pressure generator arranged in the second block, a plurality of inlet valves, a first group of wheel ports arranged on the first block and are connected to the brake master cylinder and the first electric pressure generator via respective inlet valves of the plurality of inlet valves, a second group of wheel ports arranged on the second block and are connected to the second electric pressure generator via additional respective inlet valves of the plurality of inlet valves;

a brake pedal coupled to the master brake cylinder; and a plurality of wheel brakes connected to the wheel ports of the brake system; and wherein the inlet valves connected to the wheel ports of the first group are connected to the brake master cylinder via a common isolating valve, and the inlet valves connected to the wheel ports of the second group are connected to one of the brake master cylinder or to an additional brake cylinder via an additional common isolating valve.

16. The motor vehicle as claimed in claim 15, wherein the motor vehicle has a first wheel brake, a second wheel brake, a third wheel brake, and a fourth wheel brake of the plurality of wheel brakes, wherein the first wheel brake is assigned to a front wheel, and the second wheel brake is assigned to a diagonally opposite rear wheel, wherein the third wheel brake is assigned to a front wheel, and the fourth wheel brake is assigned to a diagonally opposite rear wheel, wherein the third wheel brake and the fourth wheel brake are connected to the wheel ports of the first group; and wherein the first wheel brake and the second wheel brake are connected to the wheel ports of the second group.

\* \* \* \* \*